(12) United States Patent
Hedlund et al.

(10) Patent No.: US 11,904,365 B2
(45) Date of Patent: Feb. 20, 2024

(54) SUPPORT ARM ARRANGEMENT FOR A LOCAL GAS EXTRACTOR, AND A LOCAL GAS EXTRACTOR WITH SUCH A SUPPORT ARM ARRANGEMENT

(71) Applicant: FUMEX AB, Skellefteå (SE)

(72) Inventors: Lars Hedlund, Skellefteå (SE); Tomas Bellgran, Skellefteå (SE); Gustav Stenberg, Skellefteå (SE); Patrik Andersson, Boliden (SE); Petter Arnqvist Eriksson, Skellefteå (SE)

(73) Assignee: FUMEX AB, Skellefteå (SE)

( * ) Notice: Subject to any disclaimer, the term of this patent is extended or adjusted under 35 U.S.C. 154(b) by 11 days.

(21) Appl. No.: 16/973,417

(22) PCT Filed: May 28, 2019

(86) PCT No.: PCT/SE2019/050494
§ 371 (c)(1),
(2) Date: Dec. 8, 2020

(87) PCT Pub. No.: WO2019/235990
PCT Pub. Date: Dec. 12, 2019

(65) Prior Publication Data
US 2021/0237132 A1  Aug. 5, 2021

(30) Foreign Application Priority Data

Jun. 8, 2018  (SE) .................................. 1850702-0

(51) Int. Cl.
*B08B 15/02*  (2006.01)
*B08B 15/04*  (2006.01)
(Continued)

(52) U.S. Cl.
CPC ............ *B08B 15/02* (2013.01); *A47L 7/0009* (2013.01); *A47L 9/248* (2013.01); *B08B 15/04* (2013.01); *A47L 9/242* (2013.01)

(58) Field of Classification Search
CPC .......... A47L 9/24; A47L 19/242; A47L 17/04; B29D 99/0007; B29C 65/227;
(Continued)

(56) References Cited

U.S. PATENT DOCUMENTS

| 2,243,637 A | * | 5/1941 | Landis | ..................... B08B 15/04 |
| | | | | 55/471 |
| 3,818,817 A | * | 6/1974 | Nederman | ............ B08B 15/002 |
| | | | | 138/108 |

(Continued)

FOREIGN PATENT DOCUMENTS

| CN | 101282794 A | 10/2008 |
| CN | 201684765 U | 12/2010 |

(Continued)

OTHER PUBLICATIONS

Aspirator definition attachement obtained from https://www.dictionary.com/browse/aspirator (Year: 2022).*

(Continued)

*Primary Examiner* — Eric J Rosen
*Assistant Examiner* — Christopher Soto
(74) *Attorney, Agent, or Firm* — MARSHALL, GERSTEIN & BORUN LLP

(57) ABSTRACT

A support arm arrangement for a local gas extractor arrangement and a local gas extractor arrangement including such a support arm arrangement. The support arm arrangement includes a first support arm and at least one second support arm being pivotally coupled to each other by friction joint arrangements. The support arm arrangement receives a tube device coupled to an extractor hood, an exterior pump (Continued)

device and the support arms. The extractor hood is arranged at an outermost second support arm by a linkage arm arrangement including a first link arm pivotally coupled to the outermost second support arm by a first friction joint pivotable about a first pivoting axis, and a second link arm fixedly attached to the extractor hood and pivotally coupled to the first link arm by a second friction joint pivotable about a second pivoting axis extending in a direction perpendicular to the first pivoting axis.

18 Claims, 4 Drawing Sheets

(51) Int. Cl.
*A47L 7/00* (2006.01)
*A47L 9/24* (2006.01)

(58) Field of Classification Search
CPC .............. B29C 66/10; B29C 66/81411; B60G 2200/1322; B60J 3/0252; F05B 2240/301; F16L 3/00; F16L 13/02; F16L 13/06; F16F 9/285; F16C 2322/59
USPC .................................................. 248/280.11
See application file for complete search history.

(56) References Cited

U.S. PATENT DOCUMENTS

| | | | | |
|---|---|---|---|---|
| 4,158,462 A | * | 6/1979 | Coral | ................... F16L 27/0857 |
| | | | | 285/283 |
| 4,446,861 A | * | 5/1984 | Tada | ..................... B08B 15/002 |
| | | | | 128/863 |
| 4,540,202 A | * | 9/1985 | Amphoux | ................ F16L 3/015 |
| | | | | 403/111 |
| 4,541,327 A | | 9/1985 | Lundstrom | |
| 4,666,328 A | | 5/1987 | Ryu | |
| 4,699,046 A | * | 10/1987 | Bellieni | .............. F16L 27/0861 |
| | | | | 248/281.11 |
| 4,860,644 A | | 8/1989 | Kohl et al. | |
| 5,014,693 A | * | 5/1991 | Wright, II | ............ F16M 13/027 |
| | | | | 248/280.11 |
| 5,398,978 A | * | 3/1995 | Gagnon | ................... F16L 27/08 |
| | | | | 403/91 |
| 5,427,569 A | | 6/1995 | Plymoth | |
| 6,322,618 B1 | | 11/2001 | Simms et al. | |
| 7,954,779 B2 | * | 6/2011 | Coral | ..................... F16M 11/10 |
| | | | | 248/280.11 |
| 8,777,934 B1 | | 7/2014 | Tan et al. | |
| 9,656,309 B2 | | 5/2017 | Hedlund et al. | |

FOREIGN PATENT DOCUMENTS

| | | | | |
|---|---|---|---|---|
| CN | 206796569 U | 12/2017 | | |
| DE | 32 25 953 A1 | 1/1984 | | |
| DE | 87 15 910 U1 | 2/1988 | | |
| DE | 10 2005 031494 A1 | 1/2007 | | |
| EP | 0516213 A1 | 12/1992 | | |
| EP | 2547464 A1 | 1/2013 | | |
| EP | 2 995 388 A1 | 3/2016 | | |
| JP | S5645771 A | 4/1981 | | |
| KR | 20090026400 A | * 3/2009 | ............... | E04B 1/24 |
| SE | 435240 B | 9/1984 | | |
| TW | M248992 U | 11/2004 | | |
| WO | WO-9205875 A1 | 4/1992 | | |
| WO | WO-98/39112 A1 | 9/1998 | | |
| WO | WO-03100313 A1 | 12/2003 | | |
| WO | WO-2007015663 A1 | 2/2007 | | |
| WO | WO-2011/115558 A1 | 9/2011 | | |
| WO | WO-2017072395 A1 | 5/2017 | | |
| WO | WO-2017169153 A1 | 10/2017 | | |

OTHER PUBLICATIONS

KR Pub. No. 2009/0026400 A, Kwon Hyuk-tae, PDF Translation (Year: 2009).*
Examination Report issued in Indian Patent Application No. 202047046893, dated Jul. 27, 2021.
Communication Pursuant to Rule 164(1) EPC, issued in European Patent Application No. 19815314.0, dated Feb. 3, 2022.
First Office Action, Chinese Patent Application No. 201980035116.X, dated Apr. 2, 2022.
European Search Report, corresponding European Patent Application No. 19815314.0, dated Jun. 9, 2022.
Second Office Action, Chinese Patent Application No. 201980035116.X, dated Aug. 17, 2022.
International Search Report and Written Opinion for PCT/SE2019/050494, dated Jul. 8, 2019.
Swedish Search Report received for Application No. 1850324-3, dated Sep. 11, 2018.
First Office Action received for SE Application No. 1850324-3, dated Sep. 11, 2018.
Second Office Action received for SE Application No. 1850324-3, dated Nov. 18, 2019.
Third Office Action, Chinese Patent Application No. 201980035116.X, dated Jan. 28, 2023.
Rejection Decision, Chinese Patent Application No. 201980035116.X, dated Apr. 19, 2023.

* cited by examiner

SUPPORT ARM ARRANGEMENT FOR A LOCAL GAS EXTRACTOR, AND A LOCAL GAS EXTRACTOR WITH SUCH A SUPPORT ARM ARRANGEMENT

TECHNICAL FIELD

The present disclosure relates to a support arm arrangement for a local gas extractor, and a local gas extractor comprising such a support arm arrangement according to the appended claims.

BACKGROUND ART

Local gas extractor devices and local gas extractor arrangements are used in plurality of facilities and technical fields. A local gas extractor may in general be perceived as a vacuum cleaner of sorts, fixedly assembled in a facility and supported by a support arm arrangement holding the tubing and extractor hood thereof in specific positions, and providing the possibility of adjusting said positioning depending on needs specific for said facility.

Depending on which technical field such a device is to be used, the requirements of its technical features, its shape and design, may vary. A local gas extractor to be used for extraction of welding gases in a metal workshop will naturally have different properties coupled thereto compared to a local gas extractor that is used in a clean laboratory environment for example.

In general, regardless of the proposed usage of such a device and its intended placement in a facility, a sturdy and reliable functionality is desirable. If an extractor hood of such a device is positioned in a specific local orientation and position, it is thus desired that it remain in that position. The positioning will always depend on the functionality of the support arm arrangement coupled thereto, which arrangement should hold the extractor hood and tubing or similar in place, but also allow for re-positioning if needed. This if commonly achieved by friction joints intermediately coupled between support arm elements of the support arm arrangement, wherein such friction joints may be designed in various ways depending on the requirements stemming from its intended usage in the present technical field.

As was briefly mentioned above, clean environments will bring forth distinct requirements stemming from a need for cleanliness. Such environments may be in medicinal technical fields, such a hospitals, morgues or similar, but also fields related to food, such as restaurants, food industrial facilities or similar. Local gas extractor devices and/or arrangements for such facilities and environments may thus be subjected to much higher demands and requirements compared to other industrial applications, while manufacturing costs and usability still needs to be kept in mind. Furthermore, a large plurality on factors come in play when striving for a clean, and easy to keep clean, local gas extractor or a support arm arrangement thereto. Movability and weight, overall design and design of small details, chosen materials, surface finish, and electrical conductivity are some variables that may have an effect on cleanliness, and such variables may not always point in the same direction when it comes to design of such a device or arrangement. It is thus not obvious how to provide a local gas extractor or a support arm arrangement for such a device, which has reliable and user friendly features adapted for clean environments.

There is thus a need for an improved support arm arrangement and an improved local gas extractor, which alleviates problems related to usage of such devices and arrangement in clean environments.

SUMMARY OF THE INVENTION

Despite prior art there is a need to develop an improved support arm arrangement for a local gas extractor, which is easy and reliable to use while keeping its weight low. There is also a need to develop such a support arm arrangement that is adapted for use in clean environments, wherein generated debris therefrom is kept to a minimum and the support arm arrangement is easy to keep clean. Further, there is a need to develop a local gas extractor utilizing such a support arm arrangement, and providing the same benefits as mention with reference to the support arm arrangement above.

An object of the invention is this to provide an improved support arm arrangement for a local gas extractor, which is easy and reliable to use while keeping its weight low. An additional object is to provide a support arm arrangement that is configured for use in clean environments, wherein generated debris therefrom is kept to a minimum and the support arm arrangement is easy to keep clean. A further object of the invention is to provide a local gas extractor utilizing such a support arm arrangement.

According to a first aspect, a support arm arrangement for a local gas extractor arrangement is provided. The support arm arrangement may comprise a first support arm arranged to a plate member provided with means for fixedly attaching said plate member to an exterior surface. The support arm arrangement may further comprise at least one second support arm, wherein each support arm may be pivotally coupled to each other by means of intermediately arranged friction joint arrangements. The support arm arrangement may further comprise an extractor hood having a first opening provided with a circumferential flange and a second opening through which gas is extracted from a surrounding environment. The support arm arrangement may be arranged to receive a tube device, which may be coupled to the circumferential flange of the extractor hood and to an exterior pump device, wherein said tube device may be coupled to the support arms by means of a plurality of retainer devices.

The extractor hood may further be arranged at a distance from an end portion of an outermost second support arm by means of an intermediary arranged linkage arm arrangement. The linkage arm arrangement may comprise a first link arm, pivotally coupled to the end portion of the outermost support arm by means of first friction joint. The first friction joint being pivotable about a first pivoting axis, which extends in a direction perpendicular to an extending direction of the outermost second support arm. The linkage arm arrangement may further comprise a second link arm, fixedly attached to the extractor hood and pivotally coupled to the first link arm by means of a second friction joint. The second friction joint may be pivotable about a second pivoting axis, which extends in a direction perpendicular to the first pivoting axis.

This has the advantage that the extractor hood is provided with a high movability, and may be moved in all directions so as to achieve an easy to use positioning of said extractor hood. Furthermore, as the pivoting axes are separated from each other, a non-obvious advantage is that fewer moving parts will be in motion when modifying the positioning of the extractor hood in one direction only. This is beneficial as parts moving against each other, which is the obvious case for friction joints, always will generate microscopic particles, which may be undesirable in clean environments. Another non-obvious advantage gained by means of providing the extractor hood with a high mobility is that the larger friction joints of the support arms will be used to a lesser extent when changing the positioning of the extractor hood. This in turn leads to lesser microscopic particles generated from said larger and bulkier friction joints arranged at the support arms, due to such larger friction joints being comprised of more material being in contact with other material, which in practice always leads to more debris and particles being generated. The features of the support arm arrangement are thus especially advantageous for facilities with strict regulations regarding cleanliness, such as facilities related to food and manufacturing thereof, or medicinal facilities such as hospitals and morgues or similar. This thus provides a reliable, highly movable and clean support arm arrangement for such environments.

According to an aspect, the first link arm of the linkage arm arrangement may comprise an L-shape and may be arranged so as to encircle a quarter of a circumference of a tube device arranged to the support arm arrangement, at a radial distance from an outer surface of said tube device. The second link arm may further be attached at an outer edge of the extractor hood.

This has several advantages. Firstly, the linkage arm arrangement being arranged on the outside of the tube device, when arranged at the support arm arrangement, and especially being positioned at a radial distance from the outer surface of the tube device, alleviates the risk of the linkage arm arrangement getting in contact with the tube device. This is beneficial as lesser impact between mechanical parts lowers shavings of material from said parts being removed therefrom, and a lowers the risk of particle generation. Furthermore, as the linkage arm arrangement is arranged at the outside of the tube device, mobility of the tube device and the extractor hood is improved, as not having a similar linkage device inside of the tube device allows for free movement of the tube device relative such a linkage device. An even further advantage is that by means of arranging the linkage arm arrangement in such a manner, the second link arm, and to some extent the first link arm, may serve an additional function as a handle for controlling the positioning of the extractor hood. Thus, additional parts and material is not needed to provide a handle to said extractor hood, wherein the manufacturing costs are lowered and a total weight of the support arm arrangement is lowered as well. Furthermore, as the linkage arm arrangement is arranged outside of the tube device instead of inside, the flow of gas may behave in a less turbulent manner compared to if it would be arranged within the tube device, which is a common practice for similar devices/arrangements. Lesser turbulence is beneficial in that it lowers the risk of said turbulence spreading particles and dust around at the opening of the extractor hood, wherein cleanliness is improved in the surrounding environment. Furthermore, the linkage arm arrangement is also much easier to clean and keep clean when it is arranged outside of the tube device, wherein cleanliness in and around the arrangement is improved even further. Thus, a plurality of non-obvious benefits are achieved by means of the design of the linkage arm arrangement as presented herein.

According to an aspect, each second support arm may comprise a circumferential wall having a triangular cross sectional shape with a rounded top, wherein each support arm comprises a hollow interior. A base of the triangular shape may be arranged to support a tube device arranged thereto.

This has the advantage that a very rigid and stable framework is provided, where the total weight is kept to a minimum. A support arm arrangement having a low weight is always preferred as the user experience is improved, and lesser force is needed at the friction joints to keep the structure in its desired position. The described shape of the second support arms is also easy to provide with a fine surface structure, and is void of crevasses and recesses, wherein cleanliness is easier to uphold for the arrangement.

According to an aspect, each second support arm may further comprise longitudinally arranged flanges, extending along the base of the triangular shape, and in a plane in which angled portions of the circumferential wall constituting the triangular shape are extending within.

This has the advantage said flanges may assist in holding the tube device in place, both for assembly of a local gas extractor arrangement, and for use thereof. Furthermore, said flanges may improve the stability and rigidity of the support arm arrangement with a very low amount of added material. Even further, the flanges may be utilized to make manufacturing easier, as a single sheet of material may be easier to form to its correct shape by means of using machinery known in the art for such forming processes. Thus, manufacturing costs may be kept low. A further advantage of using a metal sheet instead of, for example, using an extruded structure is that it is possible to achieve a much better surface finish for the surfaces of the second support arm. As a better surface finish directly relates to lowering the "stickiness" of said surface with regards to dirt, dust, particles and debris or similar, cleanliness may also be improved as a side effect of this feature.

According to an aspect, the retainer devices may comprise a resilient element, arranged to encircle a tube device arranged in the support arm arrangement so as to hold said tube device pressed against the support arms.

This has the advantage that a resilient material, such as for example rubber or similar, allows for some leeway of movement of the tube device. That will in turn lower the risk of subjecting parts of said tube device to sharper bends and turns during positioning. This again lowers the amount of particles and debris generated from such movement, as the risk of providing sharp bends, which may result in cracking of the material thereof, is lowered. Furthermore, a resilient material in contact with the tube device will result in the same type of effect locally at contact points between the tube device and the retainer devices.

According to an aspect, each retainer device may further comprise a bracket having a shape that conforms with the shape of the second support arms. Each bracket may further comprise two opposite positioned pins, wherein each resilient element may further comprise two correspondingly arranged holes, which are arranged to be coupled to said pins.

This has the advantage that assembly and de-assembly of such retainer devices is both fast and easy to perform. For such a coupling of the retainer devices to the remainder of the arrangement, no tools are needed as well, wherein the user experience is improved. As no tools are needed, and the coupling is so fast and easy to use, cleanliness is easier to uphold as it is both fast and easy to remove a retainer device so as to clean both said retainer device and the support arm arrangement.

According to an aspect, each resilient element may comprise two opposite positioned fastening devices, arranged to be coupled to the flanges of a second support arm.

This has the advantage that the coupling is fast and easy to assemble and de-assemble, while the contact and thus tightly positioned adjacent surfaces are kept to a minimum. This is beneficial as two surfaces positioned adjacent each other always results in micro-crevasses between the two, in which crevasses bacteria and dirt/dust may accumulate over time.

According to an aspect, each resilient element may be a ring-shaped element, arranged to encircle a second support arm and a tube device arranged thereto.

This has the advantage that the retainer devices are extremely easy to use, as no moving or loose parts are present. Such ring-shaped element may simply be provided to the second support arms before assembly, and then a tube device may be inserted between the two for a fast and easy assembly. Furthermore, as there are a large variety of commonly used similar devices for several technical fields, manufacture and/or purchase thereof may be kept very low which results in a very cost effective product.

According to an aspect, the friction joint arrangements may comprise two convexly shaped base discs and an intermediately positioned friction disc. The three discs comprises a centrically positioned hole, through which a screw element is arranged, said screw member being arranged to receive a nut element so as to provide a compressing force acting on the discs, which force is directed to a circumference of the base discs due to their convex shape.

This has the advantage that a large force may be directed to the circumference of the discs, at which circumference the frictional surfaces are most effective regarding holding such a friction joint in position. A non-obvious advantage of this feature is thus that larger friction discs may be used to increase reliability and effectiveness of the joint, while still allowing for the active surfaces being subjected to frictional contact may be kept low. This thus results in lesser material contact, which in turn leads to lesser generation of particles and debris, wherein cleanliness is improved.

According to an aspect, a local gas extractor arrangement is provided. The local gas extractor arrangement may comprise a tube device, coupled to a pump device, which is arranged to extract gas through said tube device. The local gas extractor arrangement may further comprise a support arm arrangement according to the disclosure, wherein the tube device is coupled to said support arm arrangement by means of a plurality of retainer devices.

This has the advantage that a local gas extractor arrangement may be provided with a support arm arrangement having any of the previously described advantages of its individual distinct features. Thus, a local gas extractor arrangement is provided, which local gas extractor arrangement is easy and effective to use, having a low total weight, and being configured for usage in clean environments in a plurality of ways.

Additional objectives, advantages and novel features of the invention will be apparent to one skilled in the art from the following details, and through exercising the invention. While the invention is described herein, it should be apparent that the invention may be not limited to the specifically described details. One skilled in the art, having access to the teachings herein, will recognize additional applications, modifications and incorporations in other areas, which are within the scope of the invention.

BRIEF DESCRIPTION OF THE DRAWINGS

Below is a description of, as examples, embodiments with reference to the enclosed drawings, in which.

DETAILED DESCRIPTION

The detailed description with reference to the embodiments depicted are to be viewed as exemplary embodiments comprising a combination of certain features, which features have been described in detail above. It is thus to be understood that additional embodiments may be achieved by combining other features into embodiments not depicted herein. The figures are to be viewed as examples and not mutually exclusive combinations. It should also be noted that all figures shown and described are schematically represented, wherein generic parts of machinery or similar may not be depicted for the sake of simplicity.

Figure 1:
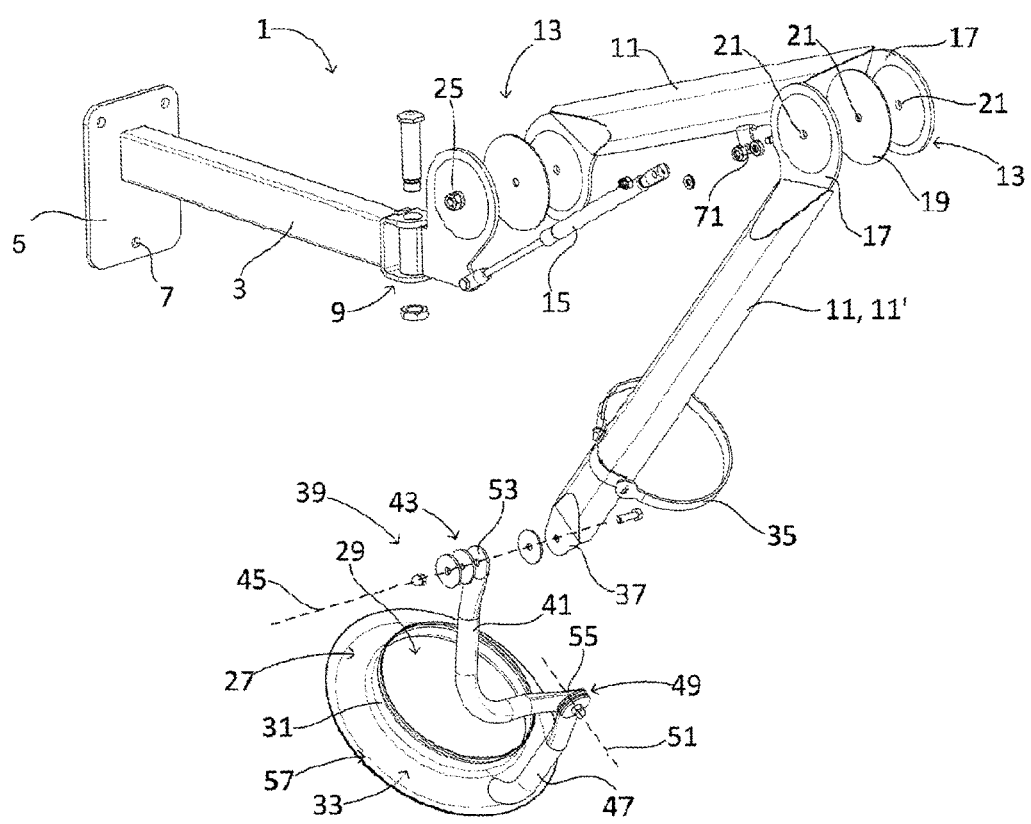
FIG. 1 shows a support arm arrangement in an exploded perspective view according to an embodiment.

FIG. 1 shows a support arm arrangement 1 in an exploded perspective view according to an embodiment. The support arm arrangement 1 is generally configured for receiving and firmly holding a tube device for a local gas extractor arrangement. The support arm arrangement 1 may comprise a first support arm 3 arranged to a plate member 5 provided with means for fixedly attaching said plate member 5 to an exterior surface. In the example shown in FIG. 1 three holes 7 are shown, but the number of such holes 7 may, as should be obvious, vary depending on the application of the support arm arrangement 1. The first support arm 3 and the plate member 5 arranged thereto is furthermore according to this embodiment arranged to be attached to a wall of a building or facility. However, the first support arm 3 may also be extending in other directions, such as upwards, or at an angle, wherein other manner of attaching options may be used, such as mounting the plater member 5 to a ceiling instead of a wall. As is seen in FIG. 1, the arrangement 1 may further comprise a pivoting coupling 9 between the first support arm 5 and the rest of the arrangement 1, so as to provide a movability to the entirety of the structure. The support arm arrangement 1 may further comprise at least one second support arm 11, wherein each support arm 3, 11 may be pivotally coupled to each other by means of intermediately arranged friction joint arrangements 13. The arrangement 1 may, as shown in FIG. 1, comprise two second arm members 11, coupled to each other as stated above. The number of second support arms 11 may however be three, four, or any plurality of second support arms 11 deemed suitable for an application of such an arrangement 1. As is further shown in FIG. 1, the connection between the first support arm 3 and the adjacent second support arm 11 may comprise a damper device 15, such as a gas spring for example. Such a device 15 may be opted to be used to bring stability to positioning of the support arm arrangement 1, wherein the number of such devices 15 and their placement within the arrangement 1 should be considered as obvious design choices for a person skilled in the technical field.

The friction joint arrangements 13 may further comprise two convexly shaped base discs 17 and an intermediately positioned friction disc 19. The three discs 17, 19 comprises a centrically positioned hole 21 each, through which a screw element (not shown in the exploded view) is arranged, said screw member being arranged to receive a nut element 25 so as to provide a compressing force acting between the discs 17, 19, which force is directed to a circumference of the base discs 17 due to their convex shape. As the force for such an embodiment is directed outwards (relative the centre), a larger frictional force may be obtained with smaller interacting areas, as the radial distance from the centrically arranged holes 21 provides a moment arm between the rotational axis and the interacting surfaces. Thus, as the interacting frictional surfaces may be made smaller, the risk of generating particles is lowered which improves the sanitary aspect of such frictional joint arrangements 13.

The support arm arrangement 1 may further comprise an extractor hood 27 having a first opening 29 provided with a circumferential flange 31 and a second opening 33 through which gas is extracted from a surrounding environment. The extractor hood 27 may be shaped as truncated cone, or exhibit a more flat shape, or any other suitable and desirable shape. The support arm arrangement 1 may thus be arranged to receive the previously mentioned tube device, which may be coupled to the circumferential flange 31 of the extractor hood 27 and to an exterior pump device, wherein said tube device may be coupled to the support arms 3, 11 by means of a plurality of retainer devices 35. Neither the tube device nor the exterior pump device are shown in FIG. 1. In general, such a tube device may be comprised of a flexible tubing, made of a polymeric material, a metal, or a composite, wherein such a tube device also often comprises a metal coil or similar, incorporated into the tube, so as to provide a better stability to the otherwise flexible tube. For the specific support arm arrangement 1 presented herein, it should be noted that a tube device should have a smooth surface finish, and contain as few cracks and crevices as possible, so as to make cleanliness easier and to avoid a build-up of bacteria, dirt, dust and such therein. It should also be mentioned that an exterior pump device as mentioned above may be located at a distance from the support arm arrangement 1, wherein such an exterior pump device may be part of a ventilation system of a facility, or a pump device arranged specifically for operation of the described local gas extractor arrangement.

The extractor hood 27 may further be arranged at a distance from an end portion 37 of an outermost second support arm 11' by means of an intermediary arranged linkage arm arrangement 39. The linkage arm arrangement 39 may comprise a first link arm 41, pivotally coupled to the end portion 37 of the outermost support arm 11' by means of first friction joint 43. The first friction joint 43 being pivotable about a first pivoting axis 45, which extends in a direction perpendicular to an extending direction of the outermost second support arm 11'. The linkage arm arrangement 39 may further comprise a second link arm 47, fixedly attached to the extractor hood 27 and pivotally coupled to the first link arm 41 by means of a second friction joint 49. The second friction joint 49 may be pivotable about a second pivoting axis 51, which extends in a direction perpendicular to the first pivoting axis 45. The extractor hood 27 may thus be moved freely in all directions relative the outermost second support arm 11', due to the two pivoting axes 45, 51 providing pivoting in perpendicular directions.

The linkage arm arrangement 39 may, as shown in FIG. 1, more specifically comprise a first unitary link arm 41 having an L-shape, wherein it may be arranged so as to encircle a quarter, or the vicinity of a quarter, of a circumference of a tube device arranged to the support arm arrangement 1. It should be noted that the term "L-shaped" should herein be perceived in a broad sense, wherein if the shape is described in more detail it may deviate from the shape of an L in a strict sense. The first link arm 41 may be said to comprise a first end 53 and a second end 55, wherein the first end 53 is coupled to the first friction joint 43 and the second end 55 is coupled to the second friction joint 49. The exact extension of the first link arm 41 there between may vary in a plurality of obvious ways. The main feature herein, and its technical effect, is that the first and second ends 53, 55 provide a separation of the first and second pivoting axes 45, 51 related thereto, and that said pivoting axes 45, 51 are angled perpendicular relative each other by means of the change of extending directions of the first and second ends 53, 55 of the first link arm 41. The first link arm 41 may further be arranged so as to encircle said tube device at a radial distance from an outer surface of the tube device. Said radial distance may vary along the extension of the first link arm 41 however, but it should be noted that the main effect of said radial distance is to provide a clearance between the linkage arm arrangement 39 and an installed tube device. Such a clearance provides more mobility to the tube device and thus as a result the extractor hood 27, due to a lower risk of the first link arm 41 engaging the tube device which potentially could impair a free movement of the tube device. By means of separating the two pivoting axes 45, 51, instead of using for example a universal joint, which is a common practice for providing a three dimensional movement in a joint, an additional effect of such an arrangement is provided. The additional technical effect is that an extension of the first and second pivoting axes 45, 51 always will be aligned so as to pass through a centre of the tube device, or in the vicinity of said centre. Thus, even if the first and second friction joints 43, 49 of the linkage arm arrangement 39 are arranged rather close to the tube device, a pivoting about their individual pivoting axes 45, 54 will never result in the tube device being moved towards said friction joints 43, 49. Therefore, a free three-dimensional movement is provided, without restrictions in any specific direction being added to the functionality thereof. Furthermore, as contact between objects/parts of the support arm arrangement 1 may lead to wear and degradation of the materials thereof, an added benefit is thus that the individual parts are saved from unnecessary such wear and degradation, and also that a lesser amount of particles will be generated from the arrangement 1. This promotes a cleaner support arm arrangement 1, which makes it suitable for usage in environments that have strict regulations regarding cleanliness. The second unitary link arm 47 may further be attached at an outer edge 57 of the extractor hood 27. This further enhances the described clearance between the linkage arm arrangement 39 and a tube device, which thus also enhances the positive benefits thereof. Even further, the second link arm 47 may thus be used as a handle for positioning and re-positioning operations for the extractor hood 27. By means of holding the second link arm 47, an operator who is performing a positioning operation of the extractor hood 27 may easily rotate his/her wrist so as to pivot the extractor hood 27 about the second pivoting axis 51, or angle his/her wrist up or down so as to pivot the extractor hood 27 about the first pivoting axis 45. A very precise positioning may thus be achieved in an easy manner, wherein unnecessary movement of either of the two friction joints 43, 49 is minimized, due to the separation of the two friction joints 43, 49 and their respective pivoting axes 45, 51.

Figure 2:
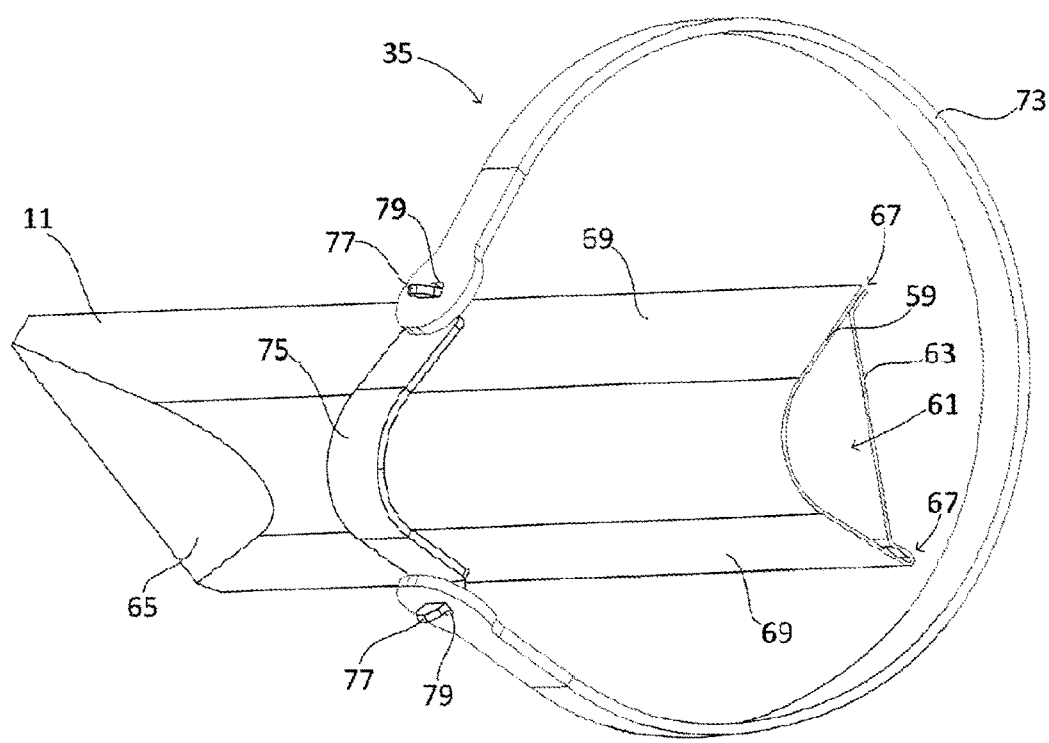
FIG. 2 shows a part of a second support arm and a retainer device in a perspective view according to an embodiment.

Now turning the attention to FIG. 2, some features according to the disclosure will be described in more detail. FIG. 2 shows a part of a second support arm 11 and a retainer device 35 in a perspective view according to an embodiment. As is clearly seen, the second support arm 11 is herein cut off perpendicular to its extending direction, wherein the shape of its cross sectional shape is seen more clearly. Each such second support arm 11 may comprise a circumferential wall 59 having a triangular cross sectional shape with a rounded top, wherein each second support arm 11 comprises a hollow interior 61. A base 63 of the triangular shape may thus be arranged to support a tube device arranged thereto. The material of the second support arms 11 may preferably be a metallic material, and wherein it exhibits such a shape as described, a manufacturing of such a second support arm 11 is fast, easy and cost effective. A suitable metal sheet may be bent into its proper shape in a bending machine or similar, wherein the edges of said sheet may be welded together and polished, wherein a fine surface structure is provided. The hollow interior 61 created by such a manufacturing process allows for minimizing the total weight of the structure, wherein the final shape of the second support arm 11 still provides rigidity and structural stability to the support arm arrangement 1. The shape, and the described manufacturing method thereof, is void of small cracks and crevices, which again provides a sanitary and easy to keep clean support arm arrangement 1. As is further seen in FIG. 2, the end portion 37 of the second support arm 11 shown comprises a tilted surface 65, wherein the thickness of the second support arm 11 is lowered towards the end of its extension. Such a tilted surface 65 may be a separate piece of a suitable material, which may be welded to the triangular second support arm 11 so as to provide a hermetically sealed structure. By means of sealing the second support arm 11 in such a way, the hollow interior 61 may not allow for accumulation of dirt, dust, debris or similar.

The second support arm 11 may further comprise longitudinally arranged flanges 67, extending along the base 63 of the triangular shape, and in a plane in which angled portions 69 of the circumferential wall 59 constituting the triangular shape are extending within. The flanges 67 may thus provide support for a tube device arranged towards such a second support arm 11. As a tube device arranged thereto will be pressed against the base 63 of the triangular shape of the second support arm 11, it is to some extent held firmly in place. However, as the tube device may be subjected to lateral movement due to bending of the tube device when positioning an extractor hood, the flanges 67 may hinder such movement without actively holding the tube device in place. This results in a good balance of a firm positioning of the tube device, but while alleviating the risk of holding the tube device too tightly against the second support arm 11, which could result in degradation of the adjacently arranged materials thereof. The longitudinally arranged flanges 67 may further be utilized in additional ways. One such additional utilization may be seen with reference to FIG. 1, wherein a fastening element 71 coupled to the damper device 15 may be attached to the flange 67. Thereby fastening options are readily available all along the arranged flange 67. Another additional utilization will be described later on, with reference to FIG. 3a.

An embodiment of a retainer device 35 is also seen in FIG. 2. The retainer device 35 may, as shown in FIG. 2, comprise a resilient element 73, arranged to encircle a tube device arranged in the support arm arrangement 1 so as to hold said tube device pressed against the support arm 11. The resilient material may for example be a polymer which exhibits a suitable flexibility and strength to achieve the described technical effects. By means of using a resilient element 73, some leeway is provided with regards to relative movement of the tube device and the support arm 11. As has been described previously within the disclosure, this is beneficial, in particular for a sanitary support arm arrangement 1, as the ingoing materials will be subjected to more lenient forces and thus generate a lesser amount of particles and debris due to sharp bending which may result in cracking of the ingoing materials. The retainer device 35 as shown in FIG. 2 further comprises a bracket 75, having a shape that conforms with the shape of the second support arms 11. Each bracket 75 may further comprise two opposite positioned pins 77, wherein each resilient element 73 further may comprise two correspondingly arranged holes 79, which are arranged to be coupled to said pins 77. This configuration provides for a very fast and easy assembly and de-assembly of such a retainer device 35, which promotes a more user-friendly arrangement with regards to cleaning and keeping the arrangement clean. The bracket 75 is preferably made of a rigid material, such as a hard plastic or a metal. However, as metal-metal contact is to be avoided as much as possible due to particle generation, a shim or a non-metallic coating or layer may be provided to the inside of the bracket 75 so as to eliminate such metal-metal contact if both the second support arm 11 and the bracket 75 are made of metallic materials.

Figure 3A:
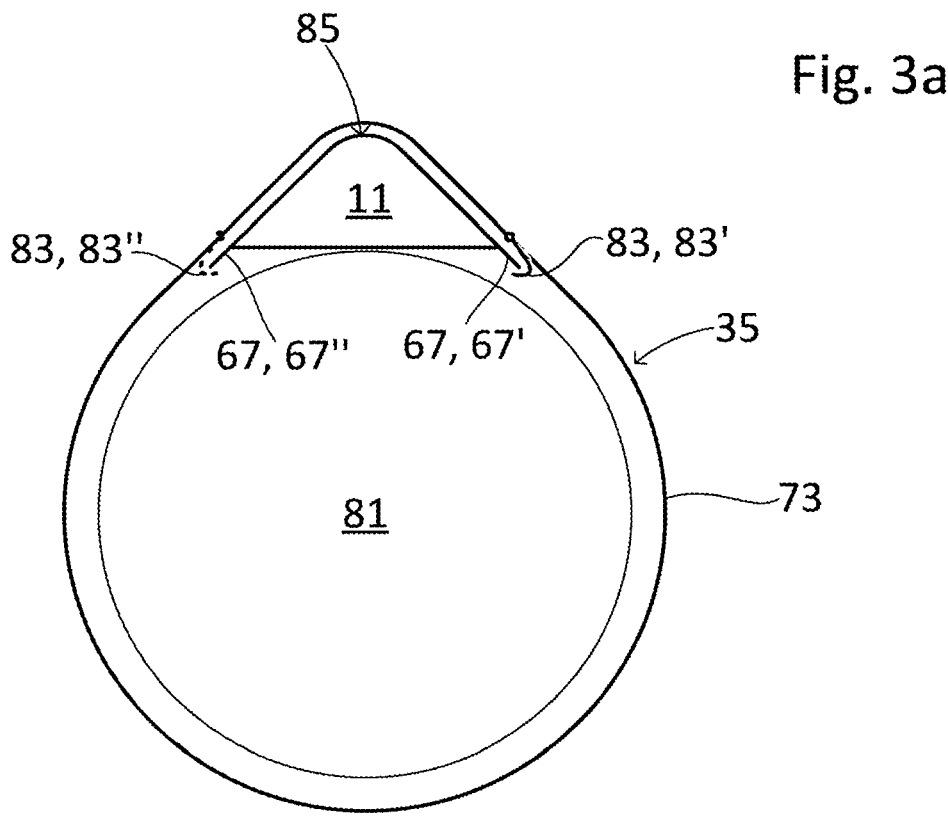
FIGS. 3a and 3b show different retainer devices in schematic cross sectional views according to alternative embodiments.
Figure 3B:
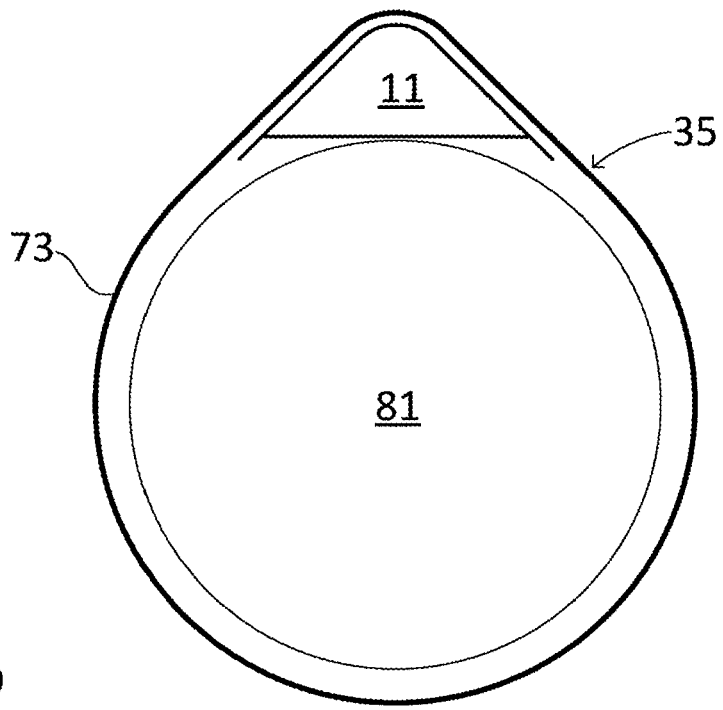

FIGS. 3a and 3b show different retainer devices 35 in schematic cross sectional views according to alternative embodiments. It should be noted that FIGS. 3a and 3b are very schematic simplifications and not to be viewed as exact drawings. The parts shown in these figures are separated from each other so as to make them easier to view. In reality, the retainer device 35 will of course be arranged in abutment with the second support arm 11 and the tube device, but said parts are herein shown separated to enhance visibility of the parts and their functionality.

FIG. 3a shows a cross sectional view of a tube device 81 arranged to a second support arm 11, wherein a retainer device 35 is enclosing said tube device 81 and second support arm 11. The second support arm 11 may be perceived as similar to the second support arm 11 as depicted in FIG. 2, having the same overall shape and being provided with flanges 67 similar to the ones shown in FIG. 2. The resilient element 73 is herein provided with two opposite positioned fastening devices 83, arranged to be coupled to the flanges 67 of a second support arm 11. The fastening devices 83 may comprise hook-like elements, which hooks are configured to wrap around the flanges 67 to hold the retainer device 35 in position. The resilient element 73 may, as shown in FIG. 3a, encircle the tube device 81, and the back portion 85 of the second support arm 11 and be coupled to the opposite arranged flange 67. Thus, as viewed in FIG. 3a, a right fastening device 83' is coupled to a right flange 67', wherein the resilient element 73 then extends over the second support arm 11 in an anti-clockwise manner. The resilient element 73 then encircles the tube device 81 until it reaches the position of the right fastening device 83'. The resilient element 73 may then be arranged at a short distance from the right fastening device 83' and the adjacent portion of the resilient element 73. Said short distance is to be understood as being in the direction of the longitudinal extension of the second support arm 11, which in FIG. 3a should be perceived as behind the resilient element 73 which is seen above the second support arm 11. Thus, the resilient element 73 is arranged parallel with itself along the back portion 85 of the second support arm 11, wherein a left fastening device 83", which is shown with dotted lines in FIG. 3a, is to be perceived as coupled to a left flange 67" at a position that is behind (as drawn herein) where the resilient element 73 first went past said left flange 67". This embodiment of the retainer device 35 is thus very fast and easy to assemble and de-assemble to a tube device 81 and a second support arm 11. Such a solution in turn provides easy access for cleaning of the tube device 81 and the second support arm 11, wherein cleanliness is improved. Furthermore, the retainer device 35 according to this embodiment is also very easy to modify with regards to how tightly it will hold the tube device 81 towards the second support arm 11. This may be achieved by means of adjusting the distance between the two fastening devices 83', 83", wherein the resilient element 73 will be wrapped around the tube device 81 at different angles, which directly relates to how tightly it will be arranged to said tube device 81.

FIG. 3b shows another alternative embodiment of a retainer device 35. According to this embodiment, the resilient element 73 may be a ring-shaped element, arranged to encircle a second support arm 11 and a tube device 81 arranged thereto. Such a ring-shaped element may thus be arranged around the second support arms 11 before assembly of a tube device 81 thereto, wherein it is simply stretched out when a tube device 81 is to be inserted therein. As this embodiment of a retainer device 35 is made as a single piece, a risk of dropping it when assembling or de-assembling a local gas extractor arrangement is non-existent as such ring-shaped retainer devices 35 cannot fall off a local gas extractor when assembled.

Figure 4:
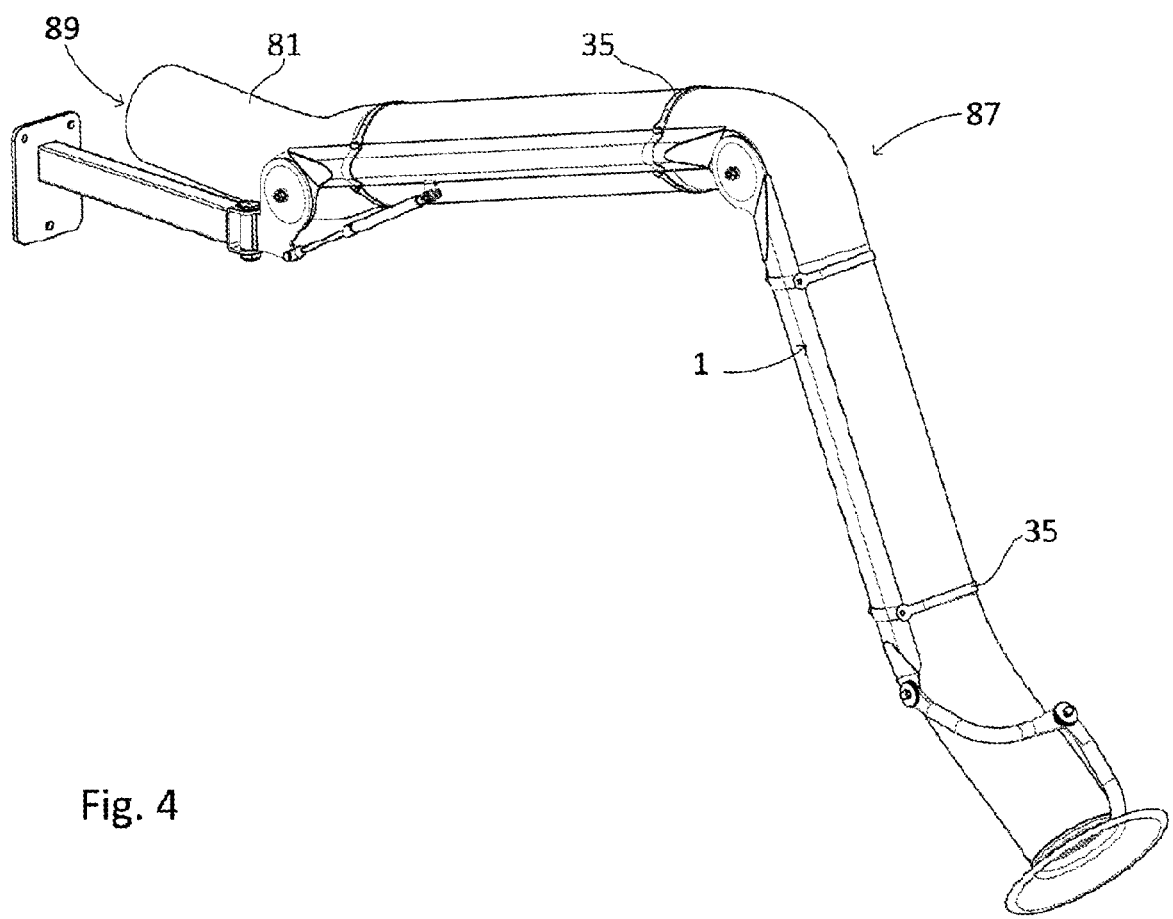
FIG. 4 shows a local gas extractor arrangement according to an embodiment.

FIG. 4 shows a local gas extractor arrangement 87 according to an embodiment. The local gas extractor arrangement 87 may comprise a tube device 81, coupled to a pump device, which is arranged to extract gas through said tube device 81. The local gas extractor arrangement 87 may further comprise a support arm arrangement 1 according to the disclosure, wherein the tube device 81 is coupled to said support arm arrangement 1 by means of a plurality of retainer devices 35. The mentioned pump device is not shown in the figure, and may simply be perceived as coupled to an end portion 89 of the tube device 81, either directly or by means of intermediate additional tubes, pipes or similar. As should be obvious, the local gas extractor arrangement 87 as shown in FIG. 4 may be provided with a support arm arrangement 1, which in turn may be provided with any of the varying features as they have been described throughout the disclosure. Thus, the local gas extractor arrangement 87 may exhibit all the positive effects of said features, but applied to the local gas extractor arrangement 87 as a whole.

The foregoing description of the embodiments has been furnished for illustrative and descriptive purposes. It is not intended to be exhaustive, or to limit the embodiments to the variations described. Many modifications and variations will obviously be apparent to one skilled in the art. The embodiments have been chosen and described in order to best explicate principles and practical applications, and to thereby enable one skilled in the arts to understand the invention in terms of its various embodiments and with the various modifications that are applicable to its intended use. The components and features specified above may, within the framework of the disclosure, be combined between different embodiments specified.

The invention claimed is:

1. A support arm arrangement for a local gas extractor arrangement, the support arm arrangement comprising:
   a first support arm coupled to a plate member adapted to be coupled to an exterior surface,
   at least one second support arm, each support arm being pivotally coupled to each other by means of intermediately arranged friction joint arrangements, and
   an extractor hood having a first opening provided with a circumferential flange and a second opening through which gas is configured to be extracted from a surrounding environment, wherein the support arm arrangement is adapted to receive a tube device that is adapted to be coupled to the circumferential flange of the extractor hood, wherein the support arrangement comprises a plurality of retainer devices adapted to couple the tube device to the support arms,
   wherein:
   the extractor hood is arranged at a distance from an end portion of an outermost second support arm by means of an intermediary arranged linkage arm arrangement comprising a first unitary link arm, pivotally coupled to the end portion of the outermost second support arm by means of a first friction joint, the first friction joint being pivotable about a first pivoting axis which extends in a direction perpendicular to an extending direction of the outermost second support arm,
   the linkage arm arrangement further comprises a second unitary link arm, fixedly attached to the extractor hood and pivotally coupled to the first link arm by means of a second friction joint, the second friction joint being pivotable about a second pivoting axis which extends in a direction perpendicular to the first pivoting axis, and
   the first link arm has an L-shape such that when the tube device is coupled to the support arm arrangement at a radial distance from an outer surface of the tube device, the first link arm is arranged so as to encircle approximately a quarter of a circumference of the tube device, so that the first and second pivoting axes are aligned so as to pass perpendicularly through the tube device.

2. The support arm arrangement according to claim 1, wherein the second link arm is attached at an outer edge of the extractor hood.

3. The support arm arrangement according to claim 2, wherein each second support arm comprises a circumferential wall having a triangular cross sectional shape with a rounded top, each second support arm comprising a hollow interior, wherein a base of the triangular shape is arranged to support a tube device arranged thereto.

4. The support arm arrangement according to claim 3, wherein each second support arm further comprises longitudinally arranged flanges extending along the base of the triangular shape, and in a plane in which angled portions of the circumferential wall constituting the triangular shape are extending within.

5. The support arm arrangement according to claim 1, wherein each second support arm comprises a circumferential wall having a triangular cross sectional shape with a rounded top, each second support arm comprising a hollow interior, wherein a base of the triangular shape is arranged to support a tube device arranged thereto.

6. The support arm arrangement according to claim 5, wherein each second support arm further comprises longitudinally arranged flanges, extending along the base of the triangular shape, and in a plane in which angled portions of the circumferential wall constituting the triangular shape are extending within.

7. The support arm arrangement according to claim 1, wherein each of the retainer devices comprises a resilient element, arranged to encircle a tube device coupled to the support arm arrangement so as to hold said tube device pressed against the support arms.

8. The support arm arrangement according to claim 7, wherein each retainer device further comprises a bracket having a shape that conforms with the shape of the second support arms, said bracket further comprising two opposite positioned pins, wherein each resilient element further comprises two correspondingly arranged holes, which are arranged to be coupled to said pins.

9. The support arm arrangement according to claim 7, wherein each resilient element comprises two opposite positioned fastening devices, arranged to be coupled to the flanges of a second support arm.

10. The support arm arrangement according to claim 7, wherein each resilient element is a ring-shaped element, arranged to encircle a second support arm and a tube device arranged thereto.

11. The support arm arrangement according to claim 7, wherein the outermost second support arm comprises flanges and wherein each resilient element comprises two opposite positioned fastening devices arranged to be coupled to the flanges of the outermost second support arm.

12. The support arm arrangement according to claim 1, wherein the friction joint arrangements comprises two convexly shaped base discs and an intermediately positioned friction disc, said three discs comprising a centrically positioned hole, through which a screw element is arranged, said screw element being arranged to receive a nut element so as to provide a compressing force acting on the discs, which force is directed to a circumference of the base discs due to their convex shape.

13. A local gas extractor arrangement, comprising:
a tube device adapted to be coupled to a pump device which is arranged to extract gas through said tube device; and
a support arm arrangement according to claim 1, wherein the tube device is coupled to said support arm arrangement by means of the plurality of retainer devices.

14. The local gas extractor arrangement according to claim 13, wherein the plurality of retainer devices retain the tube device against a surface of the outermost second support arm.

15. The support arm arrangement according to claim 1, wherein the plate member is provided with means for fixedly attaching the plate member to the exterior surface.

16. The support arm arrangement according to claim 15, wherein the means for fixedly attaching the plate member to the exterior surface comprises one or more holes formed in the plate member.

17. The support arm arrangement according to claim 1, wherein the second link arm is directly attached to an outer edge of the extractor hood between the first and second openings of the extractor hood.

18. The support arm arrangement according to claim 1, wherein the at least one second support arm comprises the outermost second support arm and an innermost second support arm, and wherein the outermost second support arm and the innermost second support arm are structurally separate from one another.

* * * * *